United States Patent [19]
Okada

[11] Patent Number: 5,355,047
[45] Date of Patent: Oct. 11, 1994

[54] CIRCUIT FOR DRIVING AN OSCILLATORY-WAVE MOTOR

[75] Inventor: Junji Okada, Hachioji, Japan

[73] Assignee: Olympus Optical Co., Ltd., Tokyo, Japan

[21] Appl. No.: 645

[22] Filed: Jan. 5, 1993

[30] Foreign Application Priority Data

Jan. 16, 1992 [JP] Japan .................................. 4-005921

[51] Int. Cl.$^5$ ............................................ H01L 41/08
[52] U.S. Cl. ...................................... 310/316; 318/116
[58] Field of Search ............... 310/316, 317, 323, 328; 318/116

[56] References Cited

U.S. PATENT DOCUMENTS

| 4,743,788 | 5/1988 | Takagi et al. | 310/316 |
| 4,833,358 | 5/1989 | Suzuki et al. | 310/316 |
| 4,888,514 | 12/1989 | Takahashi et al. | 310/316 |
| 4,952,834 | 8/1990 | Okada | 310/316 |
| 5,013,982 | 5/1991 | Sasaki | 318/116 X |
| 5,053,669 | 10/1991 | Saeki et al. | 310/323 |
| 5,061,882 | 10/1991 | Takagi | 318/116 |

FOREIGN PATENT DOCUMENTS

| 62-85684 | 4/1987 | Japan . |
| 62-166787 | 7/1987 | Japan . |
| 2-250681 | 10/1990 | Japan . |

Primary Examiner—Mark O. Budd
Attorney, Agent, or Firm—Louis Weinstein

[57] ABSTRACT

A circuit for driving an oscillatory-wave motor, which generates traveling oscillatory waves on a surface of an elastic body by applying a drive frequency voltage to an electro-mechanical energy conversion element securely fixed to the elastic body to drive a movable body in friction-contact with the surface of the elastic body, includes: an electro-mechanical energy conversion element, securely fixed to the elastic body, for detecting an oscillation frequency during the driving of the oscillatory-wave motor; a feedback signal output device for outputting feedback signals on the basis of the output of the element; an optimum drive-frequency detection device for detecting an optimum drive frequency of the oscillatory-wave motor only on the basis of the feedback signals; and an automatic drive-frequency tracking circuit for outputting detected values from the detection device as voltage values to a voltage control oscillator for generating drive frequency voltage signals.

19 Claims, 8 Drawing Sheets

CIRCUIT FOR DRIVING AN OSCILLATORY-WAVE MOTOR

BACKGROUND OF THE INVENTION

1. Field of the Invention

The present invention relates to a circuit for driving an oscillatory-wave motor. More particularly, the present invention relates to a circuit for driving an oscillatory-wave motor, which causes a piezoelectric element to generate traveling waves by the expansion and contraction movement of the piezoelectric element and drives an oscillatory-wave motor by these traveling waves.

2. Description of the Related Art

In recent years, oscillatory-wave motors have come to be widely used in various fields for driving movable bodies which are in friction-contact with a surface of an elastic body by applying an alternating voltage of a given frequency to an piezoelectric element securely fixed to the elastic body and using the expansion and contraction movement of the piezoelectric element.

The oscillatory-wave motor is also called an ultrasonic-wave motor. As disclosed in, for example, Japanese Laid-Open Patent Application sho/59-96881, it operates on the principle that displacement of an elastic body is caused by mechanical resonance when the alternating voltage applied to a piezoelectric element matches a characteristic oscillation frequency of the elastic body; and this displacement is converted into elliptic vibrations on the surface of the elastic body.

The amplitude of the elliptic vibration is not directly proportional to the magnitude of the applied voltage (electrical field) but is strongly affected by the drive frequency of the applied voltage. Therefore, the characteristics of the oscillatory-wave motor depend upon the drive frequency of the applied voltage. Drive frequencies of individual oscillatory-wave motors differ according to the resonance frequency characteristic of the motor. In addition, the optimum drive frequency has characteristics such that the optimum point changes due to variations in loads; variations in the pressing force between the movable body and the elastic body of the oscillatory-wave motor; changes in the outside environment, such as temperature; changes in internal temperature caused by self-heat generation; or the like. For this reason, the drive frequency must be made to track the optimum point during the driving of the motor.

In connection with this, as disclosed in Japanese Laid-Open Patent Application sho/63-234881, the applicant of the present invention has proposed frequency automatic tracking means in which a piezoelectric element for feedback is securely fixed to an elastic body of an oscillatory-wave motor. Said motor outputs feedback signals by a piezoelectric-element effect when the oscillatory-wave motor is driven so that the orientation of deviations in the phase differences between the drive frequency signals of the oscillatory-wave motor and the feedback signals and the amount of deviations thereof are detected, said automatic frequency tracking means changing the oscillation frequency of a frequency oscillator on the basis of an error output with a predetermined value of phase deviation detecting means, which error occurs when the drive frequency is the optimum drive frequency in accordance with the phase deviation signal.

Figure 11:
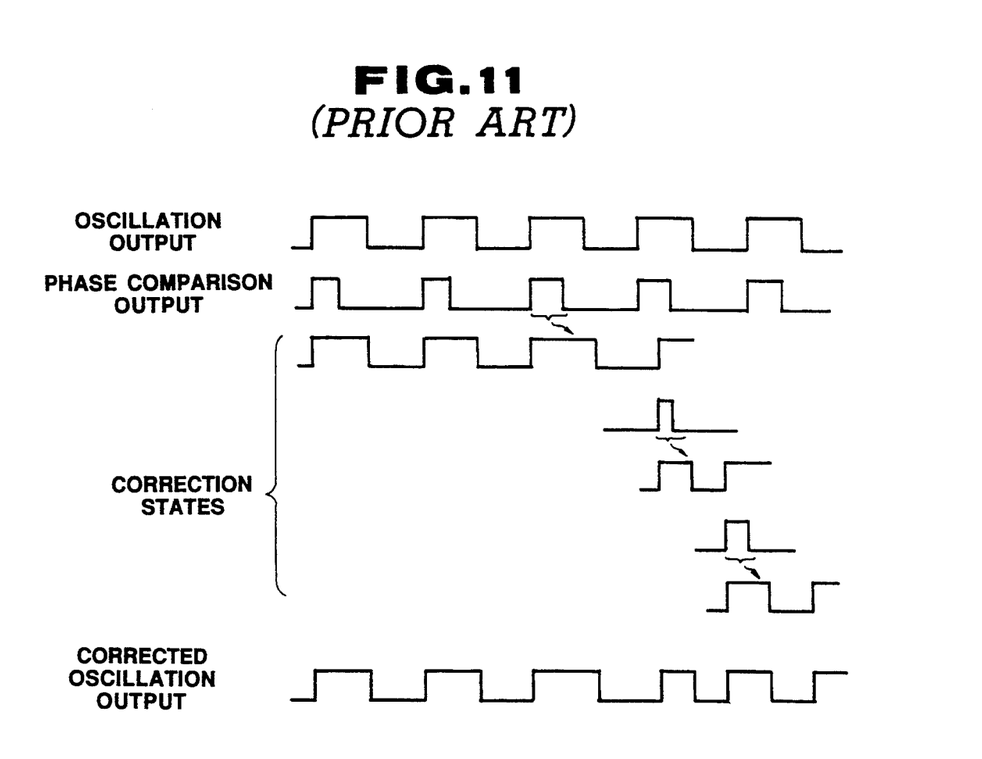
FIG. 11 is a time chart illustrating the correction means for correcting the drive frequency in a conventional circuit for driving an oscillatory-wave motor.

Since single driving in a short time and high-speed response are required in the oscillatory-wave motor, for example, for an actuator of a camera's auto-focus system, problems different from those occurring during continuous driving arise. In the phase difference detection method of the automatic frequency tracking means proposed in the above Japanese Laid-Open Patent Application sho/63-234881, it is repeated that the phase of the feedback signal is compared with that of the drive frequency signal at all times. A correction value is fed back to change the oscillation frequency. This circumstance is shown in FIG. 11. FIG. 11 shows a phase comparison output at the original oscillation output at a frequency division ratio of 1 and the correction. The finally corrected oscillation output moves to a stable point while repeating overshoot as shown in FIG. 11. To suppress this, the frequency division ratio may need to be made larger or the response slowed down by lowering the loop gain. Therefore, it takes a relatively long period of time before the frequency is stabilized, and high-speed response cannot be achieved.

SUMMARY OF THE INVENTION

Objects of the present invention are to solve the above-mentioned problems of the prior art and to provide a circuit for driving an oscillatory-wave motor having excellent tracking capability with simple circuitry.

According to the present invention, a circuit for driving an oscillatory-wave motor having excellent tracking capability which is achieved with simple circuitry can be obtained since changes in the optimum drive frequency of an oscillatory-wave motor are detected by detecting means on the basis of feedback signals only and the detected signals are supplied to a voltage control oscillator via an automatic drive frequency tracking circuit to control the oscillation frequency.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DETAILED DESCRIPTION OF THE PREFERRED EMBODIMENTS

First, the fundamental principles of the present invention will be explained before embodiments of the present invention are explained.

Figure 2:
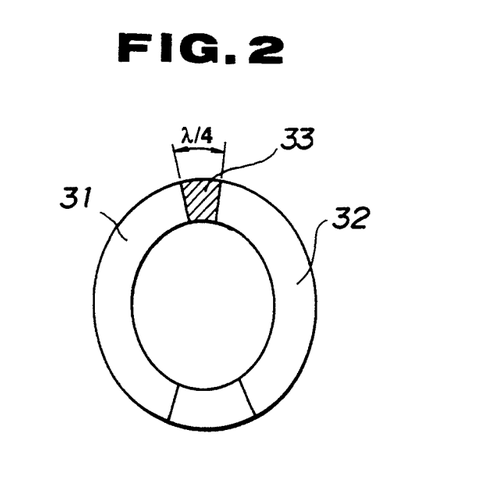
FIG. 2 is a plan view of the arrangement of a feedback signal detection electrode to which a drive frequency signal is applied.

An explanation will be given about feedback signals in a case where a feedback signal detection electrode 33 of an oscillatory-wave motor is disposed at a position where an angle $\gamma/4$ is formed between electrodes 31 and 32 to which drive frequency signals of phase A and phase B are applied, as shown in FIG. 2. When a signal indicating that the phase is shifted by $\pi/2$, i.e., $\sin \omega t$ and $\cos \omega t$ ($\omega = 2\pi f$, f: drive frequency) is applied to the electrodes 31 and 32 of the oscillatory-wave motor, to which electrodes drive frequency signals of phase A and phase B are applied, the input standing wave signals shown below occur on a surface of an elastic body which has the form of a torus:

$$\psi A = \sin \frac{2\pi}{\lambda} \left( x - \frac{\lambda}{4} \right) \cdot \sin \omega t$$

$$\psi B = \sin \frac{2\pi}{\lambda} x \cdot \sin \left( \frac{\pi}{2} - \omega t \right)$$

This combined signal appears as a traveling wave.

$$\psi = \psi A + \psi B$$
$$= \sin \frac{2\pi}{\lambda} \left( x - \frac{\lambda}{4} \right) \cdot \sin \omega t +$$
$$\sin \frac{2\pi}{\lambda} x \cdot \sin \left( \frac{\pi}{2} - \omega t \right)$$

Thus, the vibration at the central position $x = (\lambda/4)/2 = \lambda/8$ of the feedback signal detection electrode 33 can be expressed as follows by substituting $x = \lambda/8$ in the above equation:

$$\phi = \cos (\omega t - \pi/4).$$

This means that the phase difference ($\pi/4$ in this case) as regards the input signal is uniquely determined according to where on the torus the feedback signal detection electrode is provided. Thus, the feedback signal can be generally expressed by the following equation:

$$\phi = \cos (\omega t - \phi).$$

If it is assumed that the resonance point of the oscillatory-wave motor changes due to variations in temperature, pressing force, load or the like, since the oscillatory-wave motor is continuously driven by alternating signals of a given frequency, a change of phase $\phi \pm \Delta\phi$ appears in the feedback signal detection electrode. This phase change of $\pm \Delta\phi$ corresponds to the change in the resonance frequency. When the feedback signal detection electrode is formed by a piezoelectric element, the feedback signal becomes an electrical signal converted from the above vibration. Thus, the feedback signal $\phi = \cos (\omega t - \phi \pm \Delta\phi)$ indicates the optimum drive frequency of the oscillatory-wave motor.

Therefore, if the optimum drive frequency of the oscillatory-wave motor is detected by the optimum drive frequency detecting means by only feedback signals, the optimum drive frequency signal is output as a voltage value to a voltage control oscillator which generates drive frequency signals so as to change the oscillation frequency thereof, and if the oscillation timing of the voltage control oscillator is controlled by the optimum drive frequency signal, a high-speed response is made possible. The above are the fundamental principles of the present invention.

Figure 1:
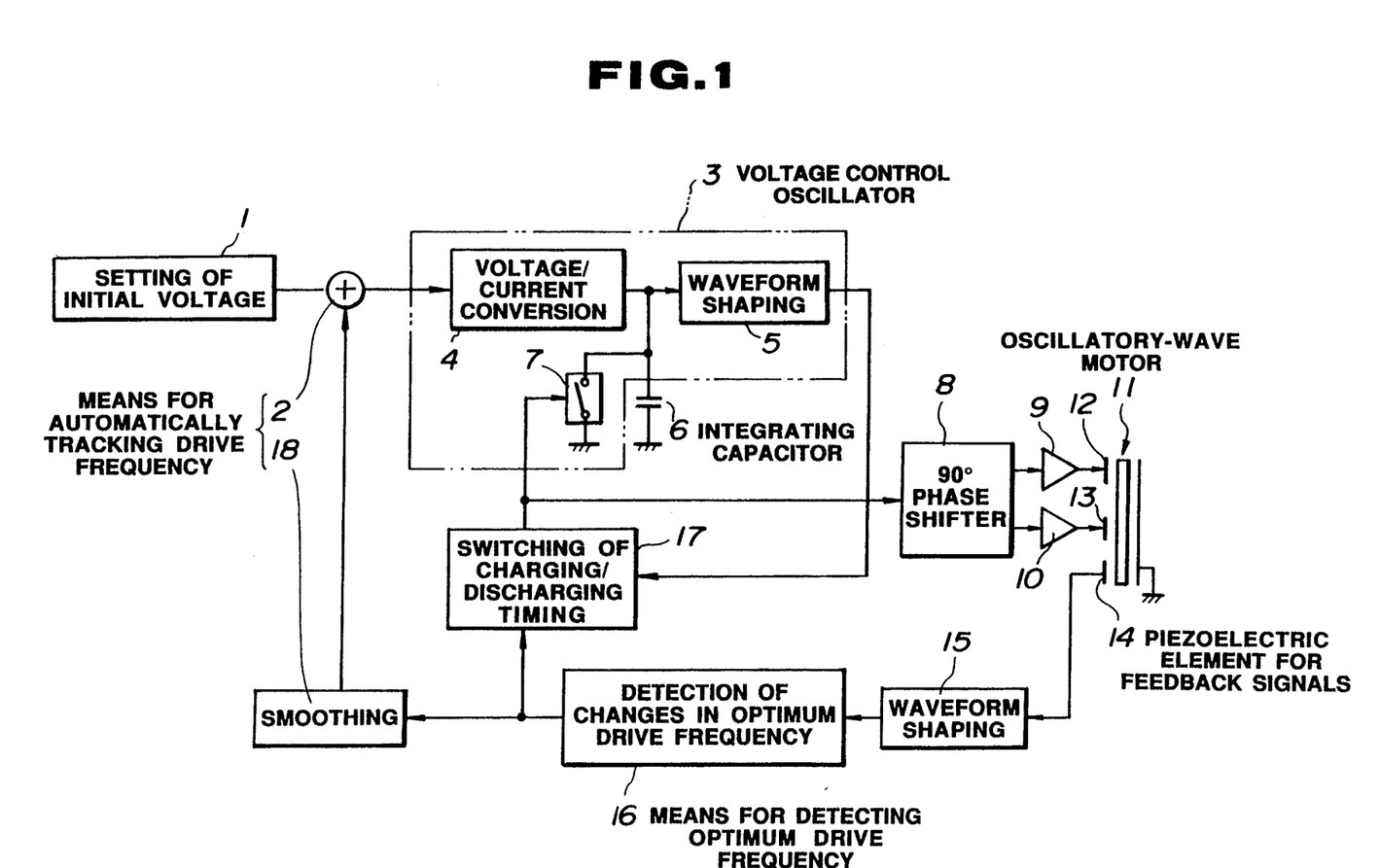
FIG. 1 is a block diagram illustrating the arrangement of a circuit for driving an oscillatory-wave motor according to an embodiment of the present invention.

FIG. 1 is a block diagram illustrating the arrangement of a circuit for driving an oscillatory-wave motor according to an embodiment of the present invention.

A voltage control oscillator 3 comprises a voltage-current conversion circuit 4 for converting an oscillation frequency control voltage into electric current to be injected into an integration capacitor 6 which will be described later; a switch 7 for switching the charging and discharging of electric charge of the integration capacitor 6 in response to a timing signal determined by a charging/discharging timing switching circuit 17 which will be described later; and a waveform shaping circuit 5 for converting a triangular-wave voltage which is a terminal voltage of the integration capacitor 6 into rectangular signals. An output from the waveform shaping circuit 5 becomes an oscillation output of the voltage control oscillator 3. This oscillation output controls the charging/discharging changing switch 7 formed of analog switches or the like via the charging/discharging timing switching circuit 17. A charging/discharging timing signal output from the charging/discharging timing switching circuit 17 is input to a 90° phase shifter 8 and used as a drive frequency signal for an oscillatory-wave motor 11.

The 90° phase shifter 8 generates two signals 90° out of phase with each other. These signals are applied as a drive frequency voltage to drive electrodes 12 and 13 of the oscillatory-wave motor 11 through amplifiers 9 and 10, respectively. As a result, traveling oscillatory waves occur on the surface of the elastic body of the oscillatory-wave motor 11, causing a rotor in friction-contact with the surface of the elastic body to be driven. At the same time, a feedback signal is generated in the feedback signal detection electrode of the oscillatory-wave motor 11 by the piezoelectric effect of a piezoelectric element 14 for feedback signals, as previously mentioned. The waveform of this feedback signal is shaped by a waveform shaping circuit 15, and changes in the drive frequency are detected by an optimum drive-frequency detection circuit 16. The signal indicating that a frequency change has been detected is smoothed by a smoothing circuit 18, and fed back as a voltage value to an addition circuit 2 in order to add them to the set voltage of an initial voltage setting circuit 1 for determining a free-run frequency. An output from the addition circuit 2 becomes the above-mentioned oscillation frequency control voltage.

The signal indicating that a frequency change has been detected is input to the charging/discharging timing switching circuit 17 so that the waveform shaping output of the voltage control oscillator 3 is controlled and the switching timing of the charging/discharging switching switch 7 is corrected.

Next, means for detecting changes in the optimum drive frequency will be explained. As previously mentioned, the feedback signal $\phi = \cos(\omega t - \phi \pm \Delta\phi)$ indicates the optimum drive frequency of the oscillatory-wave motor. Since a frequency is a time integration of phase, if the phase change amount $\pm\Delta\phi$ of the above equation is tracked on the time axis, frequency changes can be detected.

Figure 3:
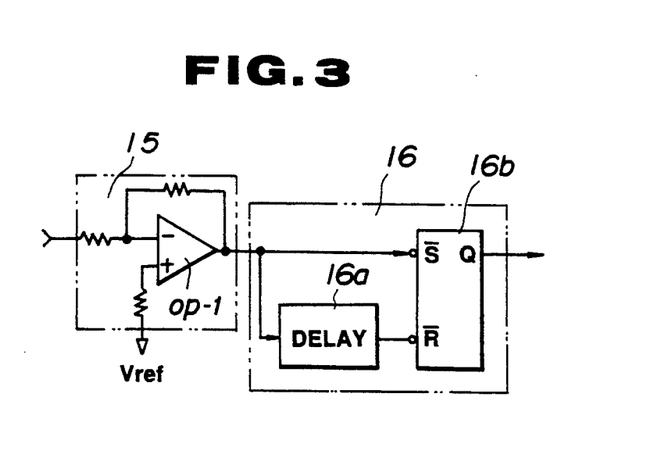
FIG. 3 is an electric circuit diagram illustrating the details of an optimum drive frequency detection circuit and a waveform shaping circuit shown in FIG. 1.
Figure 5:
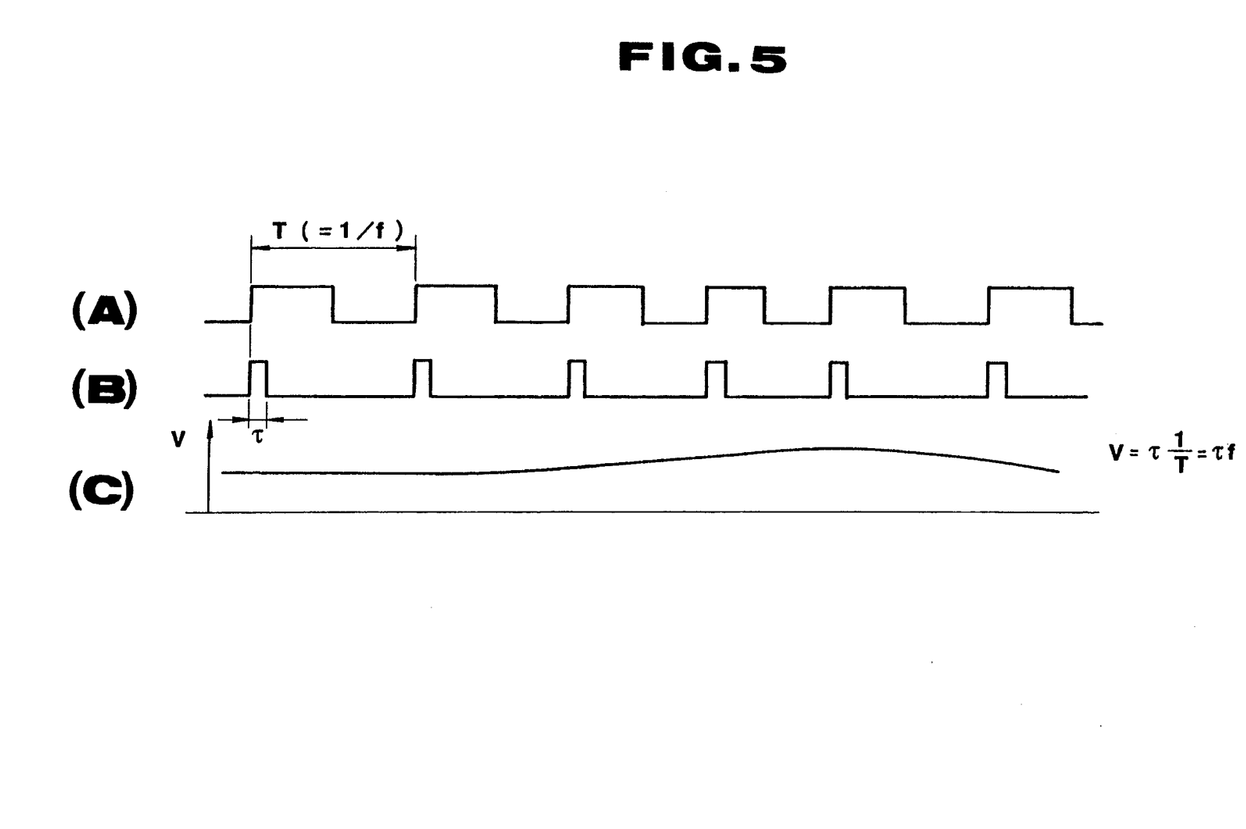
FIG. 5 is a time chart illustrating the relationship between the operating voltage waveforms of sections of the circuits shown in FIG. 3.

Here, the above fact will be explained by reference to FIG. 3 illustrating the optimum drive-frequency detection circuit 16 for detecting changes in the frequency on the basis of feedback signals and the waveform shaping circuit 15, and by reference to FIG. 5 illustrating the time chart of the operation thereof. If the waveform of the feedback signal is shaped by an operational amplifier OP-1 into a rectangular wave as shown in FIG. 3, changes in the phase of the feedback signal appear as changes in the wavelength T of the rectangular wave, as shown in FIG. 5 (A). Thus, this rectangular wave is converted into a pulse train having a pulse width $\tau$ after it is passed through a delay circuit 16a having a given delay amount, as shown in FIG. 3. Thereupon, the change of the wavelength T becomes a change of a pulse duty ratio $\tau/T$, as shown in FIG. 5(B). When this change is smoothed by the smoothing circuit 18, it appears as a change in the voltage as shown in FIG. 5(C). Thus, the relation $V = \tau/T = \tau \cdot f$ is satisfied for the voltage V. Thus, it can be seen that the voltage is proportional to the frequency. It follows that changes in the phase (frequency changes) in the feedback signal are converted into a voltage value.

Figure 4:
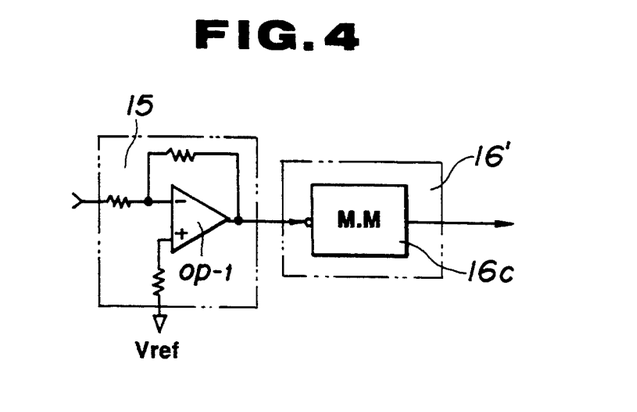
FIG. 4 is an electric circuit diagram illustrating another example of the waveform shaping circuit.

Although the optimum drive-frequency detection circuit 16 in which the delay circuit 16a and the flip-flop circuit 16b are used has been explained with reference to FIG. 3, the operation performed by the above circuits can also be performed by using a monostable multivibrator 16c, as shown in FIG. 4. In short, the optimum drive-frequency detection circuit 16 only needs to obtain a pulse output of a fixed delay amount with respect to an input, and means other than the circuit 16 may be used therefor.

Figure 6:
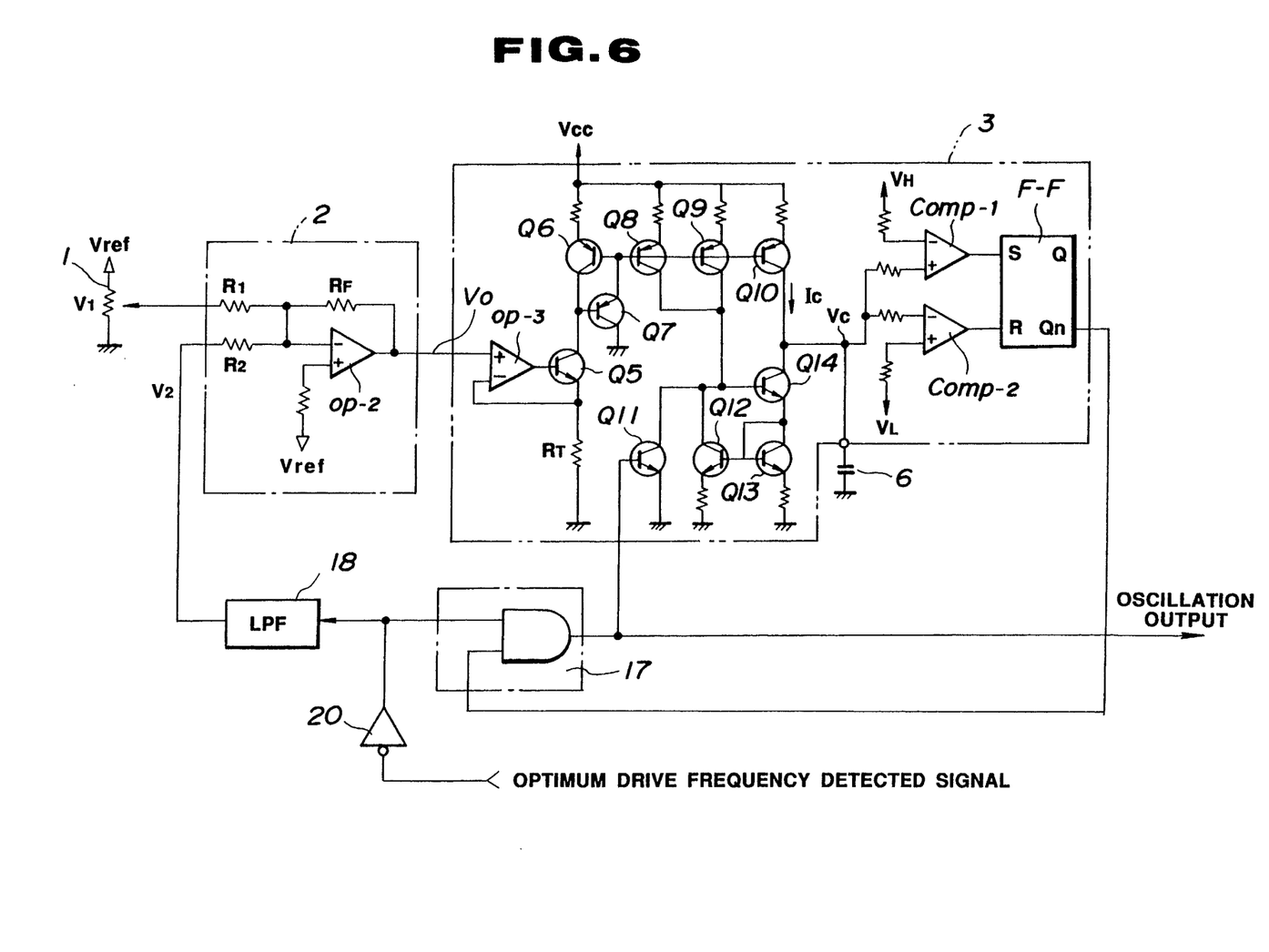
FIG. 6 is an electric circuit diagram illustrating the details of an addition circuit and a voltage control oscillator shown in FIG. 1.

Next, means for changing the drive frequency of the oscillatory-wave motor 11 by frequency changes obtained by the optimum drive-frequency detection circuit 16 will be explained by reference to a concrete circuit shown in FIG. 6.

As mentioned earlier, if an output signal from the optimum drive-frequency detection circuit 16 is passed through a low-pass filter (LPF) 18, which is a smoothing circuit, via an inverter 20, an output therefrom becomes a frequency error voltage. If this voltage is added to the addition circuit 2 formed of an operational amplifier OP-2, the voltage is added to a voltage V1 set by the initial voltage setting circuit 1 typified by a variable resistor. The oscillation frequency control voltage shown below appears in the output of the operational amplifier OP-2:

$$V0 = Vref - RF(V1/R1 + V2/R2)$$

where V2 is an output voltage from the LPF 18.

Figure 7:
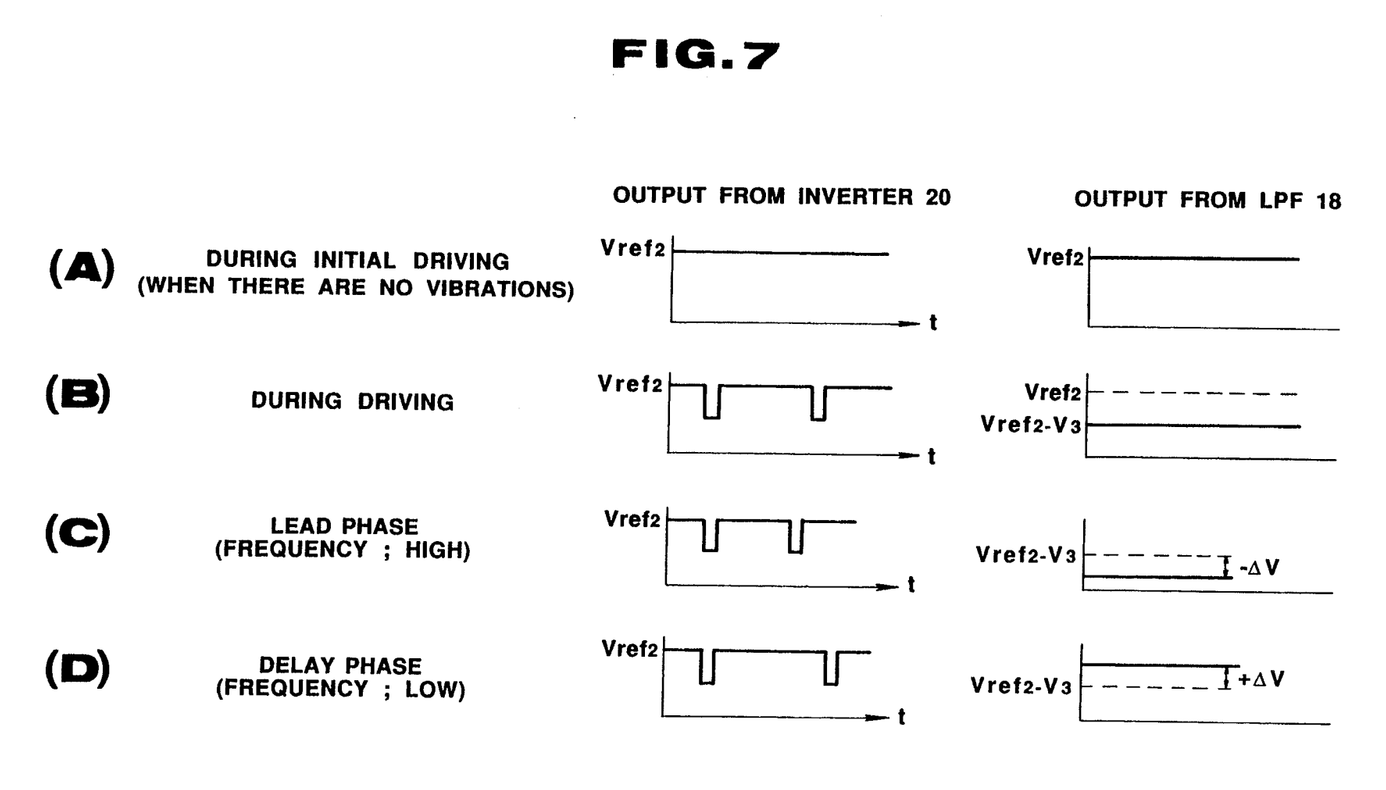
FIG. 7 is a time chart illustrating the relationship between an inverter output and a low-pass filter (LPF) output in the circuit shown in FIG. 6.

At this point, when no vibration is occurring in the oscillatory-wave motor 11, the following relation is satisfied as shown in FIG. 7(A):

$$V2 = Vref2.$$

Thus, the voltage is a fixed voltage. If vibration occurs, the following relation is satisfied as shown in FIGS. 7(B) to 7(D):

$$V2 = Vref2 - (V3 \pm \Delta V)$$

where $\Delta V$ is a frequency error voltage.

In the case of the optimum drive frequency, the following relation is satisfied as shown in FIG. 7(B):

$$V2 = Vref2 - V3.$$

If the optimum drive frequency becomes higher (lead phase), the following relation is satisfied as shown in FIG. 7(C):

$$V2 = Vref2 - V3 - \Delta V.$$

If, on the contrary, the optimum drive frequency becomes lower (delay phase), the following relation is satisfied as shown in FIG. 7(D):

$$V2 = Vref2 - V3 + \Delta V.$$

That is, when the oscillation frequency is to be made higher, the oscillation frequency control voltage becomes larger; when the oscillation frequency is to be made lower, the oscillation frequency control voltage becomes smaller.

When the oscillation frequency control voltage V0 is input to an operational amplifier OP-3 of the voltage control oscillator 3, electric current of $V0/R_T$ is made to flow through the emitter of a transistor Q5 by emitter resistance RT of the transistor Q5. Thereupon, electric current of $I_c = V0/R_T$, which is the same as the emitter current of the transistor Q5, is caused to flow through the collector of a transistor Q10 by a current mirror circuit formed of transistors Q6, Q7, Q8, Q9 and Q10.

Figure 8:
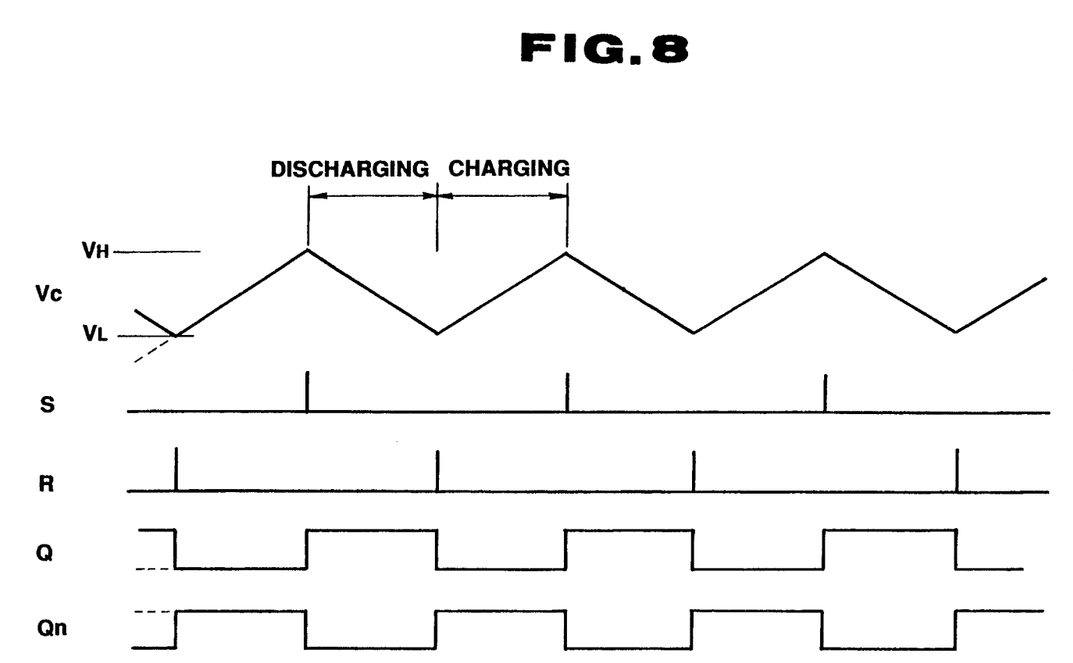
FIG. 8 is a time chart illustrating the relationship between the voltage across both ends of an integration capacitor and the output of a flip-flop circuit in the circuit shown in FIG. 6.

That means that the voltage V0 has been converted into the electric current $I_c (V0/R_T)$ by the voltage-current conversion circuit 4. The collector current $I_c$ of the transistor Q10 becomes charging current of the integration capacitor 6, and the terminal voltage $V_c$ of the capacitor 6 becomes higher with time. As shown in FIG. 8, when the terminal voltage $V_c$ of the capacitor 6 becomes higher than the threshold voltage VH of a comparator Comp-1, the output of the comparator Comp-1 is inverted and reaches an "H" level. This signal causes the flip-flop circuit F—F (see FIG. 6) to be set; the Q output reaches an "H" level and the inverted Qn output reaches an "L" level.

Since the inverted Qn output is connected to the base of the transistor Q11 which forms the charging/discharging changing switch 7 via an AND gate which is the charging/discharging timing switching circuit 17, if the inverted Qn output reaches an "L" level, the transistor Q11 is turned off. During initial driving, since the output from the inverter 20 is at an "H" level, the AND gate is in an active state.

Since a current mirror circuit formed of transistors Q12, Q13 and Q14 becomes off when the transistor Q11 is on, all of the collector current $I_c$ of the transistor Q10 charges the integration capacitor 6. However, if the transistor Q11 is turned off, the current mirror circuit is turned on. As a result, electric current such that discharge current $I_{c0}$ from the capacitor 6 is added to the collector current $I_c$ of the transistor Q10 is made to flow through the collector of the transistor Q14.

When the terminal voltage $V_c$ of the capacitor 6 becomes gradually lower and becomes lower than the threshold voltage $V_L$ of the comparator Comp-2 (see FIG. 6) during discharging, since the comparator Comp-2 is inverted and reaches an "H" level, the flip-flop circuit F—F is reset. As a result, the Q output reaches an "L" level and the inverted Qn output reaches an "H" level, causing the transistor Q11 to be turned on and causing the capacitor 6 to return to a charged state again. In this way, the output of the voltage control oscillator 3 repeats oscillating by the charging and discharging of the integration capacitor 6. If the capacitance value of the integration capacitor 6 is denoted as $C_T$, the oscillation frequency f in this condition can be expressed as follows:

$$f = V0/\{2\ C_T R_T (V_H - V_L)\}.$$

Figure 9:
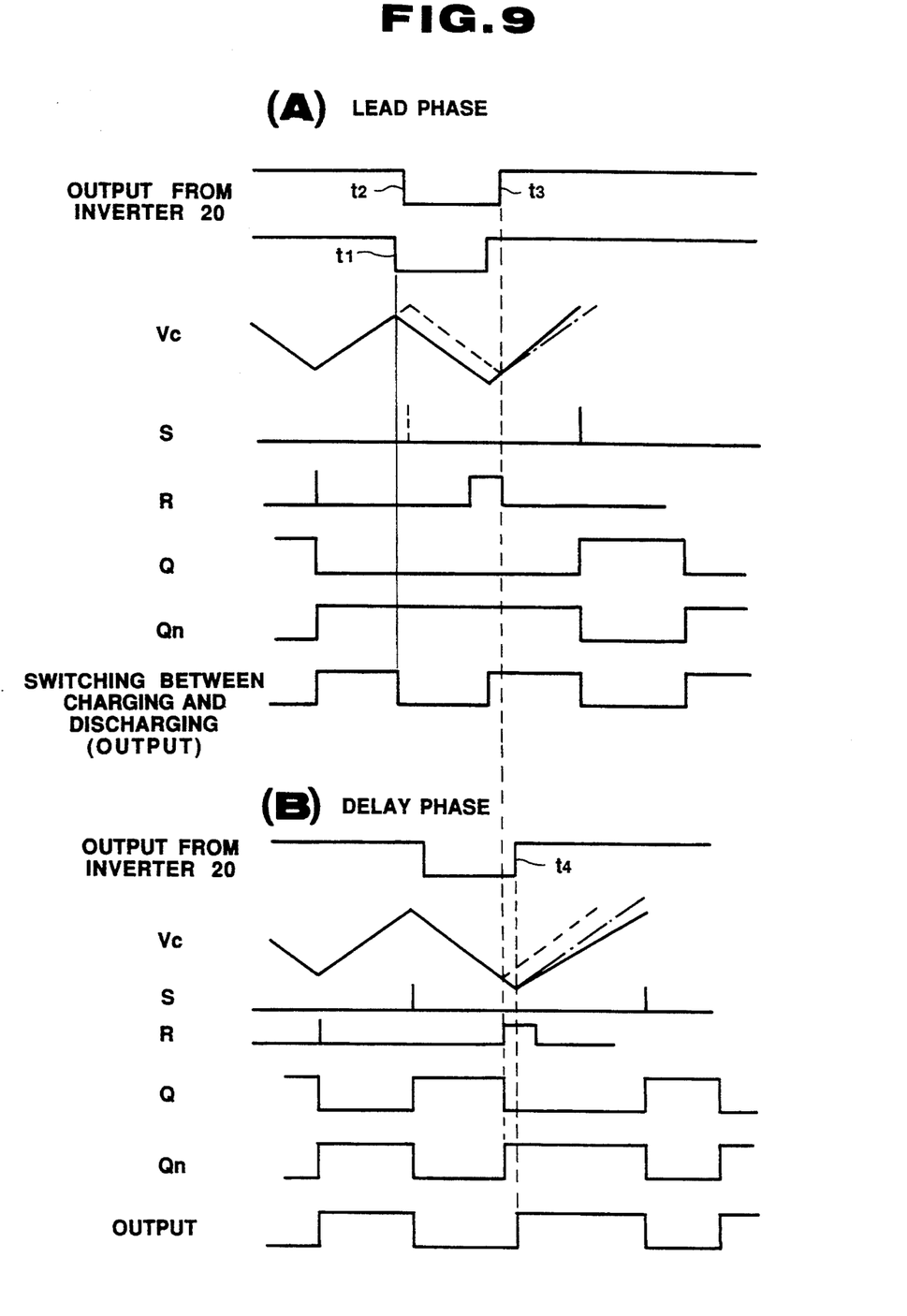
FIG. 9 is a time chart illustrating correction means in a case of a deviation from an optimum drive point in the circuit shown in FIG. 6.

Let it be assumed that the oscillatory-wave motor 11 is driven at the optimum drive frequency, $V2 = Vref2 - V3$, as previously explained with reference to FIG. 7(B). Means for correcting a deviation from the optimum point will be explained with reference to time charts shown in FIGS. 9(A) and 9(B).

The position of the piezoelectric element 14 for feedback signals of the oscillatory-wave motor 11 is set so as to synchronize with a discharge time period of the voltage control oscillator 3. The delay amount of the optimum drive-frequency detection circuit 16 is set so as to coincide with the discharge time period. Since a signal indicating that an optimum drive frequency has been detected is input to the AND gate of the charging/discharging timing switching circuit 17 via the inverter 20 and since Qn output of the flip-flop circuit F—F of the voltage control oscillator 3 is input thereto, the integration capacitor 6 enters a charged state when both the output of the inverter 20 and the Qn output are at an "H" level. If, on the other hand, the output from the inverter 20 reaches an "L" level, the integration capacitor 6 is forcibly placed in a discharge state.

That is, the charging/discharging timing of the integration capacitor 6 can be shifted by controlling it by the signal indicating that an optimum drive frequency has been detected only when the drive frequency deviates from the optimum drive frequency.

In FIG. 9(A), if the phase is assumed to be a lead phase in which the optimum drive frequency is higher, the terminal voltage $V_c$ of the capacitor 6 becomes gradually higher. The output of the inverter 20 reaches an "L" level at time t1 before time t2 when the flip-flop circuit F—F is set. As a consequence, the AND gate of the charging/discharging timing switching circuit 17 reaches an "L" level, and the transistor Q11 is turned off. The current mirror circuit formed from transistors Q12, Q13 and Q14 becomes on, and the integration capacitor 6 is forcibly placed in a discharge state. As a result, because discharge starts earlier, the terminal voltage $V_c$ of the capacitor 6 changes as indicated by the solid line as opposed to the voltage change which should have occurred as indicated by the dotted line in FIG. 9(A).

Then, the discharge progresses. When the output of the comparator Comp-2 reaches an "H" level, causing the flip-flop circuit F—F to be reset, and charging begins, the terminal voltage $V_c$ of the capacitor 6 should change as indicated by the alternately long and short dashed line in the figure. However, since the output of the inverter 20 is fed back to the addition circuit 2 through the LPF 18 as previously explained, the oscillation frequency control voltage V0 is large during lead phase, and the current $I_c$ to be charged into the integration capacitor 6 increases. Since an increase in the charging current $I_c$ changes in a direction in which the inclination of the terminal voltage $V_c$ of the capacitor 6 rises, the terminal voltage $V_c$ results in changing as indicated by the solid line. In this way, the charging-/discharging switching signal, i.e., the oscillation output, is corrected so as for the frequency to become higher.

On the other hand, during delay phase in which the optimum drive frequency is low, the phase is as shown in FIG. 9(B). The output of the inverter 20 acts to extend the discharge time period of the integration capacitor 6 only in the duration of the "L" level. That is, the terminal voltage $V_c$ of the capacitor 6 becomes gradually smaller, and the output of the comparator Comp-2 reaches an "H" level at time t3, causing the flip-flop circuit F—F to be reset. Thus, even if the Qn output is inverted to an "H" level, the capacitor is forcibly placed in a discharge mode during the time the output of the inverter 20 is at an "L" level. Therefore, the terminal voltage $V_c$ of the capacitor 6 starts rising at time t4 which is delayed as opposed to the voltage rise which should have occurred as indicated by the dotted line in the figure.

At this point, since the signal indicating that the optimum drive frequency has been detected is fed back to the oscillation frequency control voltage as a frequency error voltage through the LPF 18, as was also stated, the oscillation frequency control voltage V0 becomes small during delay phase, and the current $I_c$ to be charged into the integration capacitor 6 decreases. The decrease in the charging current $I_c$ causes the inclination of the terminal voltage $V_c$ of the capacitor 6 to be small, as indicated by the solid line. The frequency of the charging/discharging switching signal (oscillation output) is corrected so as to become lower.

Figure 10:
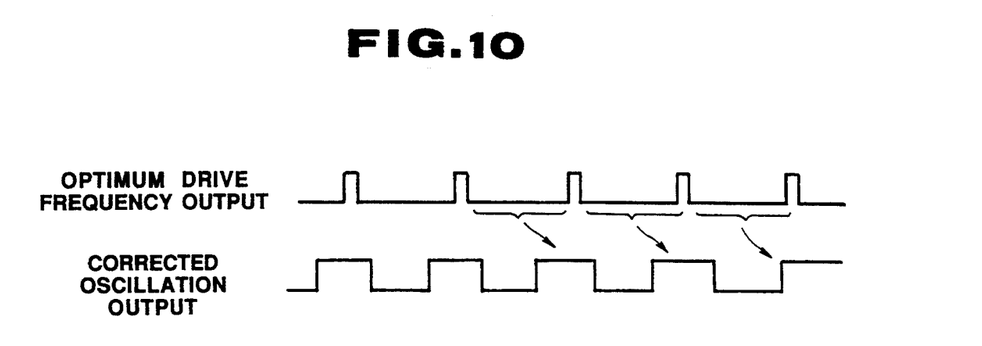
FIG. 10 is a time chart illustrating the relationship between the optimum drive frequency output and a corrected oscillation output according to this embodiment.

By detecting changes in the optimum drive frequency on the basis of feedback signals, changing the control voltage of the voltage control oscillator on the basis of these signals, and changing the charging/discharging time of the voltage control oscillator in the above-described way, automatic optimum drive-frequency tracking of the oscillatory-wave motor is made possible. In addition, since changes in the frequency are detected and fed back as frequency error signals to a voltage control oscillator, smooth correction of oscillation output frequency with a small amount of time lag is made possible as shown in FIG. 10.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included with the spirit and scope of the claims. The following claims are to be accorded the broadest interpretation, so as to encompass all such modifications and equivalent structures and functions.

What is claimed is:

1. A circuit for driving an oscillatory-wave motor, which has a voltage control oscillator for outputting frequency signals corresponding to an input voltage and which generates driving signals for driving the oscillatory-wave motor on the basis of the frequency signals, said circuit, designed to automatically track variations of the resonance frequency of the oscillatory-wave motor, comprising:

an electro-mechanical energy conversion element associated with said motor for detecting an oscillation frequency during the driving of the oscillatory-wave motor;

a feedback pulse signal output circuit for outputting feedback pulse signals on the basis of an output from the electro-mechanical energy conversion element for a detection purpose; and a voltage adjustment circuit for generating an adjustment voltage corresponding to the frequency of the feedback pulse signal and resetting an input voltage of the voltage control oscillator responsive to said adjustment voltage so that the frequency of the driving signal becomes optimum, wherein said voltage control oscillator comprises:

a voltage-current conversion circuit for outputting electric current corresponding to an input voltage;

an integration capacitor being selectively charged/discharged by the converted current;

a digital comparison circuit which is inverted according to the integration voltage of the integration capacitor; and a charging/discharging switching circuit for switching the charging/discharging timing of the integration capacitor in response to one of the output of the digital comparison circuit and the feedback pulse signal, which charging/discharging timing switching circuit outputs the driving signal in synchronization with the switching timing.

2. A circuit for driving an oscillatory-wave motor, which generates traveling oscillatory waves on a surface of an elastic body by applying a drive frequency voltage to an electro-mechanical energy conversion element securely fixed to the elastic body to drive a movable body in friction-contact with the surface of the elastic body, comprising:

a voltage control oscillator for generating a drive frequency voltage;

means, securely fixed to said elastic body, for outputting feedback signals responsive to the driving of the oscillatory-wave motor;

detection means for generating an optimum drive frequency signal on the basis of the feedback signals;

frequency changing means responsive to said detection means for converting the feedback signals into a voltage for changing the output frequency of the voltage control oscillator; and timing changing means for changing the oscillation timing of the voltage control oscillator on the basis of the outputs of the detection means and the frequency changing means.

3. A circuit according to claim 2, wherein said frequency changing means comprises initial voltage setting means for setting an initial output frequency of said voltage control oscillator and voltage addition means for converting detected values of said detection means into a voltage and adding it to an output voltage of the initial voltage setting means.

4. A circuit according to claim 2, wherein the output frequency of said timing changing means is a driving frequency to be applied to said electro-mechanical energy conversion element.

5. A circuit according to claim 2, wherein said timing changing means includes means for producing a logical AND product of a detected output of said detection means and an output of said voltage control oscillator to generate an output to change an oscillation timing of said voltage control oscillator.

6. A circuit for driving an oscillatory-wave motor, comprising:

output means for determining a drive frequency of said oscillatory-wave motor according to an input voltage and outputting it as a drive frequency signal;

supplying means for generating an alternating voltage on the basis of said drive frequency and supplying it to said oscillatory-wave motor;

feedback means for detecting an oscillation state of said oscillatory-wave motor and outputting feedback signals; and means for adjusting an input voltage of said output means so that the frequency of the alternating voltage matches the frequency of the feedback signals on the basis of the feedback signals, wherein said output means comprises synchronization means for inputting the feedback signals and causing the feedback signals to synchronize with said drive frequency signals.

7. A circuit for driving an oscillatory-wave motor, comprising:

means for supplying an alternating driving voltage to said oscillatory-wave motor;

means for detecting an actual drive frequency of the oscillatory-wave motor and outputting feedback signals;

means for changing the frequency of the driving signal on the basis of the feedback signals; and means for forcibly causing the feedback signals to synchronize with said driving signals.

8. A circuit for driving an oscillatory-wave motor, which generates traveling oscillatory waves on a surface of an elastic body by applying a drive frequency voltage to an electro-mechanical energy conversion element securely fixed to the elastic body to drive a movable body in friction-contact with the surface of the elastic body, comprising:

an oscillator having an oscillator timing for generating a drive frequency voltage;

means, securely fixed to said elastic body, for outputting feedback signals responsive to the driving of the oscillatory-wave motor;

detection means responsive to said feedback signals for generating an optimum drive frequency signal as a timing signal; and timing changing means for changing the oscillation timing of the oscillator responsive to said timing signal and the output of the oscillator.

9. A circuit according to claim 8, wherein the output frequency of said timing changing means is a driving frequency to be applied to said electro-mechanical energy conversion element.

10. A circuit according to claim 8, wherein said timing changing means includes means which feeds back an output, which is a logical AND product of a detected output of said detection means and an output of said oscillator, to an input of said oscillator in order to change the oscillation timing of said voltage control oscillator.

11. A circuit for driving an oscillatory-wave motor, which generates traveling oscillatory waves on a surface of an elastic body by applying a drive frequency voltage to an electro-mechanical energy conversion element securely fixed to the elastic body to drive a movable body in friction-contact with the surface of the elastic body, comprising:
- a voltage control oscillator for generating a drive frequency voltage;
- feedback signal output means, securely fixed to said elastic body, for outputting feedback signals responsive to driving of the oscillatory-wave motor;
- detection means coupled to said feedback means for detecting changes in frequency of the feedback signals to generate an optimum drive signal; and
- drive frequency tracking means responsive to frequency changes detected by said detection means for generating a correction voltage value representing said frequency changes, said correction voltage value altering the drive frequency voltage applied to the voltage control oscillator.

12. A circuit for driving an oscillatory-wave motor, which generates traveling oscillatory waves on a surface of an elastic body by applying a drive frequency voltage to an electro-mechanical energy conversion element securely fixed to the elastic body to drive a movable body in friction-contact with the surface of the elastic body, comprising:
- a voltage control oscillator for generating a drive frequency voltage;
- feedback signal output means, securely fixed to said elastic body, for outputting feedback signals responsive to the driving of the oscillatory-wave motor;
- detection means for generating an optimum drive frequency signal of the oscillatory-wave motor on the basis of the feedback signals; and
- drive frequency tracking means including switching means for forcibly controlling the oscillation timing of said voltage control oscillator on the basis of optimum frequency signals from the detection means.

13. A circuit for driving an oscillatory-wave motor, which has a voltage control oscillator for outputting frequency signals corresponding to an input voltage and which generates driving signals for driving the oscillatory-wave motor on the basis of the frequency signals, said circuit, designed to automatically track variations of the resonance frequency of the oscillatory-wave motor, comprising:
- electro-mechanical energy conversion means responsive to said motor for detecting an oscillation frequency of said motor during driving thereof;
- means responsive to said electro-mechanical energy conversion means for converting feedback pulses output by said electro-mechanical energy conversion means into pulses of a constant, predetermined pulse width which is less than the pulse width of said output pulses;
- means for smoothing said constant pulse width pulses for modifying the input voltage;
- means for converting the modified input voltage into a current;
- a capacitor being selectively charged by said current;
- means for comparing the charge level of said capacitor against upper and lower limits;
- switching means coupled to said capacitor;
- means responsive to said upper and lower limits being achieved for respectively operating said switching means for withdrawing charge current from and directing charge current to said capacitor; and
- wherein said switching means provides the alternating voltage signal for driving said motor.

14. The apparatus of claim 13 wherein said means for generating pulses of a predetermined interval further comprises bistable circuit means for initiating a pulse responsive to a feedback pulse and including delay means for terminating said initiated pulse a predetermined time interval equal to said delay responsive to the feedback pulse initiating the bistable circuit pulse and applied to said bistable circuit through said delay means.

15. The apparatus of claim 14 wherein said bistable means is a bistable flip-flop circuit having a set input coupled to receive said feedback pulses and a reset input coupled to receive said feedback pulses through said delay means.

16. The apparatus of claim 13 wherein said pulse generating means comprises monostable multivibrator means for generating a pulse of a predetermined pulse width responsive to each feedback pulse, the pulse width of each pulse generated by said monostable multivibrator means being significantly shorter in duration than said feedback pulses.

17. The apparatus of claim 13 wherein said current converter means comprises means for converting said modified voltage to a current of a predetermined magnitude; and
current mirror means coupled to said current converter means for applying a current to said capacitor means equal to said converted current.

18. The apparatus of claim 17 further comprising second current mirror means responsive to said capacitor voltage reaching a first predetermined level for diverting current away from said capacitor means and responsive to the charge level of said capacitor means reaching said lower limit for enabling current from said first current mirror means to charge said capacitor means.

19. A circuit according to claim 2 wherein said detection means comprises means for converting the feedback signals into square pulses which may change in duration due to operating conditions and means responsive to each square pulse for generating constant pulses of shorter duration than said square pulses.

* * * * *